United States Patent
Theuerkorn et al.

(10) Patent No.: US 7,654,747 B2
(45) Date of Patent: *Feb. 2, 2010

(54) MULTI-FIBER FIBER OPTIC RECEPTACLE AND PLUG ASSEMBLY

(75) Inventors: Thomas Theuerkorn, Hickory, NC (US); Martin E. Norris, Lenoir, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/716,415

(22) Filed: Mar. 9, 2007

(65) Prior Publication Data
US 2007/0172172 A1    Jul. 26, 2007

Related U.S. Application Data

(63) Continuation of application No. 11/076,684, filed on Mar. 10, 2005, now Pat. No. 7,264,402.

(51) Int. Cl.
*G02B 6/36* (2006.01)
(52) U.S. Cl. .......................... 385/59; 385/53
(58) Field of Classification Search .................. 385/53, 385/55, 56, 60, 72, 75, 78, 58, 70
See application file for complete search history.

(56) References Cited

U.S. PATENT DOCUMENTS

| | | | |
|---|---|---|---|
| 4,140,366 A | 2/1979 | Makuch et al. | 350/96.22 |
| 4,140,367 A | 2/1979 | Makuch et al. | 350/96.22 |
| 4,142,776 A | 3/1979 | Cherin et al. | 350/96.21 |
| 4,174,882 A | 11/1979 | McCartney | 350/96.21 |
| 4,279,467 A | 7/1981 | Borsuk et al. | 350/96.21 |
| 4,678,264 A | 7/1987 | Bowen et al. | 350/96.2 |
| 4,725,120 A | 2/1988 | Parzygnat | 350/96.22 |
| 4,820,185 A | 4/1989 | Moulin | 439/321 |
| 5,042,901 A | 8/1991 | Merriken et al. | 385/135 |
| 5,104,242 A | 4/1992 | Ishikawa | 385/53 |
| 5,109,452 A | 4/1992 | Selvin et al. | 385/69 |
| 5,214,830 A | 6/1993 | Rozycki | 29/240 |
| 5,242,315 A | 9/1993 | O'Dea | 439/577 |
| 5,276,750 A | 1/1994 | Manning | 385/59 |

(Continued)

FOREIGN PATENT DOCUMENTS

EP    0997757 A2    3/2000

(Continued)

OTHER PUBLICATIONS

Patent Cooperation Treaty, International Search Report for International Application No. PCT/US07/026154, Apr. 25, 2008, 2 pages.

*Primary Examiner*—Sarah Song (57) ABSTRACT

A multi-fiber fiber optic assembly comprising a receptacle and a plug that correspond and mate to optically connect a plurality of optical fibers. The receptacle comprises a receptacle housing, a receptacle multi-fiber ferrule and an excluding feature. The plug comprises a plug housing, a plug multi-fiber ferrule and a clearance opening for receiving the excluding feature therein. The receptacle and plug may further comprise at least one of a threaded coupling nut, a key for engaging a first key slot defined by the plug housing, a sleeve defining a second key slot for receiving the key therein, and a biasing spring.

21 Claims, 10 Drawing Sheets

U.S. PATENT DOCUMENTS

| | | | |
|---|---|---|---|
| 5,283,848 A | 2/1994 | Abendschein et al. | 385/59 |
| 5,473,715 A | 12/1995 | Schofield et al. | 385/53 |
| 5,590,229 A | 12/1996 | Goldman et al. | 385/59 |
| 5,715,342 A | 2/1998 | Nodfelt et al. | 385/61 |
| 5,745,622 A | 4/1998 | Birnbaum et al. | 385/75 |
| 5,778,122 A | 7/1998 | Giebel et al. | 385/55 |
| 5,892,870 A | 4/1999 | Fingler et al. | 385/59 |
| 5,896,480 A | 4/1999 | Scharf et al. | 385/88 |
| 5,920,669 A | 7/1999 | Knecht et al. | 385/76 |
| 5,940,559 A | 8/1999 | Noll | 385/53 |
| 6,069,992 A | 5/2000 | Hyzin | 385/55 |
| 6,206,579 B1 | 3/2001 | Selfridge et al. | 385/60 |
| 6,234,683 B1 | 5/2001 | Waldron et al. | 385/78 |
| 6,264,374 B1 | 7/2001 | Selfridge et al. | 385/78 |
| 6,478,625 B2 | 11/2002 | Tolmie et al. | 439/608 |
| 6,579,014 B2 * | 6/2003 | Melton et al. | 385/76 |
| 6,588,938 B1 | 7/2003 | Lampert et al. | 385/158 |
| 6,648,520 B2 | 11/2003 | McDonald et al. | 385/78 |
| 6,752,657 B2 | 6/2004 | Gehrke et al. | 439/577 |
| 6,960,025 B2 * | 11/2005 | Gurreri | 385/58 |
| 2004/0017983 A1 | 1/2004 | Chen et al. | 385/78 |
| 2004/0028342 A1 | 2/2004 | Jones et al. | 385/56 |
| 2005/0041928 A1 | 2/2005 | Zimmel et al. | 385/55 |
| 2005/0117850 A1 | 6/2005 | Milette | 385/55 |
| 2006/0045428 A1 | 3/2006 | Theuerkorn et al. | 385/53 |
| 2006/0204178 A1 | 9/2006 | Theuerkorn et al. | 385/59 |

FOREIGN PATENT DOCUMENTS

| | | |
|---|---|---|
| EP | 0997757 A3 | 1/2002 |
| WO | WO 94/15232 | 7/1994 |

\* cited by examiner

MULTI-FIBER FIBER OPTIC RECEPTACLE AND PLUG ASSEMBLY

CROSS REFERENCE TO RELATED APPLICATIONS

This application is a continuation of U.S. patent application Ser. No. 11/076,684, filed on Mar. 10, 2005 now U.S. Pat. No. 7,264,402, which is incorporated in its entirety by reference herein.

BACKGROUND OF THE INVENTION

1. Field of the Invention

The present invention relates generally to fiber optic receptacle and plug assembly, and more particularly, to a multi-fiber fiber optic receptacle and plug assembly utilizing multiple termination style ferrules for interconnecting a plurality of optical fibers within a communications network.

2. Technical Background

Optical fiber is increasingly being used for a variety of broadband applications including voice, video and data transmissions. As a result, fiber optic communications networks include a number of interconnection points at which multiple optical fibers are interconnected. Fiber optic networks also include a number of connection terminals, examples of which include, but are not limited to, network access point (NAP) enclosures, aerial closures, below grade closures, pedestals, optical network terminals (ONTs) and network interface devices (NIDs). In certain instances, the connection terminals include connector ports, typically opening through an external wall of the terminal, that are used to establish optical connections between optical fibers terminated from the distribution cable and respective optical fibers of one or more pre-connectorized drop cables, extended distribution cables, tether cables or branch cables, collectively referred to herein as "drop cables." The connection terminals are used to readily extend fiber optic communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

Conventional connector ports opening through an external wall of a connection terminal include a receptacle for receiving a connectorized optical fiber, such as a pigtail, optically connected within the connection terminal to an optical fiber of the distribution cable, for example in a splice tray or splice protector. At present, these receptacles are relatively large in size because the connection terminal in which they are located does not limit the size of the receptacle. Furthermore, existing receptacles include a receptacle housing defining an internal cavity that houses an alignment sleeve for receiving and aligning the mating ferrules. As previously mentioned, one of the mating ferrules is mounted upon the end of an optical fiber that is optically connected to an optical fiber of the distribution cable within the connection terminal. The other mating ferrule is mounted upon the end of an optical fiber of a drop cable that is inserted into the receptacle from outside the connection terminal. The alignment sleeve of the receptacle assists in gross alignment of the ferrules, and ferrule guide pins or other alignment means assist in more precise alignment of the opposing end faces of the ferrules.

In particular, a fiber optic plug mounted upon the end of a fiber optic drop cable is received within the receptacle through the external wall of the connection terminal. Typically, the plug includes a generally cylindrical plug body and a fiber optic connector including a plug ferrule disposed within the cylindrical plug body. The end of the cylindrical plug body is open, or is provided with openings, so that the ferrule is accessible within the plug body, for example to be cleaned. The plug ferrule is mounted upon one or more optical fibers of the fiber optic drop cable such that mating the plug with the receptacle aligns the optical fibers of the drop cable with respective optical fibers terminated from the distribution cable within the connection terminal. In the process of mating the plug with the receptacle, the plug ferrule is inserted into one end of the alignment sleeve housed within the receptacle. As a result of the construction of a conventional fiber optic plug, the alignment sleeve is minimally received within the open end of the plug body as the plug ferrule is inserted into the alignment sleeve.

Several different types of conventional fiber optic connectors have been developed, examples of which include, but are not limited to, SC, ST, LC, DC, MTP, MT-RJ and SC-DC connectors. The size and shape of the ferrule of each of these conventional connectors are somewhat different. Correspondingly, the size and shape of the alignment sleeve and the plug body are somewhat different. As a result, in conventional practice different fiber optic receptacles and plugs are utilized in conjunction with the different types of fiber optic connectors and/or ferrules. In this regard, the fiber optic receptacles generally define different sized internal cavities corresponding to the size of the alignment sleeve and plug body received therein, and in turn, according to the ferrule of the fiber optic connector to be inserted within the alignment sleeve.

In addition to requiring the use of different fiber optic receptacles and plugs based upon the particular type of optical connectors, conventional receptacle and plug assemblies are typically not compact enough to accommodate high-density installations. Current smaller assemblies, on the other hand, are not able to satisfy the high tensile loads required for FTTx installations, including the 600 lbs. drop cable pull test requirement, and are not able to handle mass interconnections. Exposure to adverse environmental conditions is also a significant issue since current network plans suggest that receptacles may remain unoccupied (i.e., without a mated plug) for an extended period of time. Based on tensile load requirements and the need for prolonged environmental protection, it would be desirable to provide a robust fiber optic receptacle and corresponding fiber optic plug suitable for mounting in a connection terminal or similar enclosure defining an external wall through which optical fibers are interconnected. As yet however, there is an unresolved need for a compact, yet sufficiently robust fiber optic receptacle that is configured to receive only a fiber optic plug having the same type of optical fiber connector as the receptacle. There is a further unresolved need for a fiber optic receptacle and plug assembly adapted to accommodate an alignment sleeve and any type of optical connector, wherein the receptacle and plug define corresponding alignment and keying features. There is an even further unresolved need for a fiber optic receptacle and plug assembly adapted to accommodate multiple termination style ferrules in opposed relation within a low-profile, environmentally sealed receptacle and plug having improved biasing means and force centering to ensure proper end face to end face physical contact.

SUMMARY OF THE INVENTION

One aspect of the invention is a fiber optic receptacle and plug assembly of like optical connector configuration. The corresponding receptacle and plug each include the same type of single fiber connector or multi-fiber connector, such as but not limited to, a multiple termination connector. The receptacle and plug are designed to achieve mass interconnections in both indoor and outdoor installation environments within a compact, yet sufficiently robust assembly. With respect to outdoor environments, the rugged housings of both the receptacle and plug provide improved sealing and increased mechanical strength against pulling forces as compared to conventional optical connections. In one embodiment, the receptacle portion of the assembly may be disposed within a connector port, also referred to herein as a "port," of a wall of a connection terminal. One or more receptacles may be installed within the connection terminal and remain unoccupied until needed. Once needed, a plug of like optical connector configuration is mated with the corresponding receptacle in a proper orientation as a result of alignment and keying features defined by the receptacle and plug.

In another aspect, the invention includes robust, corresponding receptacle and plug sub-assemblies comprising a multi-fiber ferrule. Each multi-fiber ferrule is biased within the receptacle and plug by way of a round spring. A ferrule boot combines sealing, ribbon guidance and force centering functions. The sealing function prevents epoxy from leaking between the ferrule and the ferrule boot, thus preventing contamination of a pin clip operable for retaining a pair of guide pins within the ferrule. The back end of the ferrule boot provides a tapered reception window for insertion of multiple individual optical fibers or an optical fiber ribbon. The ferrule boot further defines a convex dome-shaped surface that has its center point axially aligned with a center point on the end face of the ferrule between the two center fibers. A spring centering cuff is disposed on the ferrule boot to align the spring and couple the spring force to the ferrule boot. The cuff seats on the bearing surface of the ferrule boot to provide an axial spring force normal to a tangent of the dome-shaped surface aligned with the center point on the end face of the ferrule. The round spring, spring centering cuff and ferrule boot combine to provide a force centering function that properly aligns the optical fibers of the mating ferrules.

In another aspect, the invention includes a fiber optic plug including an alignment sleeve, wherein a plug housing and the alignment sleeve define alignment and keying features that allow the plug to be properly mated with a corresponding receptacle defining alignment and keying features that complement those of the fiber optic plug. Thus, a fiber optic plug of a predefined connector configuration may only be received within a receptacle of the same connector configuration. Exclusion features of the alignment sleeve prevent differing fiber optic plugs and receptacles from being mated and thus damaging the opposing ferrules and/or optical fibers of the multi-fiber connectors. The alignment sleeve assists in gross alignment of the ferrules, while guide pins assist in the fine alignment of the optical fibers. The receptacle further defines a shoulder portion having a predetermined shape that is received against the inner surface of a wall of a connection terminal defining an opening for receiving the ferrule, thereby securing the receptacle within the opening through the wall of the connection terminal and preventing the receptacle housing from rotating within the connector port.

In another aspect, the invention includes corresponding fiber optic receptacle and plug sub-assemblies. In an exemplary embodiment, the receptacle sub-assembly comprises a one-piece housing defining an internal cavity opening through opposed first and second ends, a receptacle seal, a receptacle dust cap assembly, an external retaining ring, a multi-fiber ferrule, a pair of guide pins, a pin retainer clip, a ferrule boot, a centering cuff, a round spring and a ferrule retainer. The plug sub-assembly comprises a plug outer housing, a crimp band, a coupling nut, an alignment sleeve and a plug pulling cap assembly. In another embodiment, the plug sub-assembly comprises a plug crimp insert, a plug inner housing, a multi-fiber ferrule, a ferrule boot, a centering cuff and a round spring. To mate the fiber optic plug with the fiber optic receptacle, the internal cavity of the receptacle receives the plug sub-assembly, including the alignment sleeve. The round springs of the receptacle and the plug operably engage and bias the respective multi-fiber ferrules towards one another during mating.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

DETAILED DESCRIPTION OF THE PREFERRED EMBODIMENTS

Reference will now be made in detail to the present preferred embodiments of the invention, and examples of which are illustrated in the accompanying drawings. Whenever possible, the same reference numerals will be used throughout the drawings to refer to the same or like parts. One embodiment of the multi-fiber fiber optic receptacle and plug assembly of the invention is shown in FIG. 1 with the fiber optic receptacle and corresponding fiber optic plug designated generally throughout by reference numerals 20 and 22, respectively.

Referring now to FIGS. 1-10, the exemplary embodiment of the fiber optic receptacle 20 and corresponding fiber optic plug 22 are shown. Although not shown, the receptacle 20 is typically mounted within a connector port defined by a wall of an enclosure, such as a connection terminal in a fiber optic communications network. In a particularly advantageous embodiment, the receptacle 20 is mounted within an opening formed through an external wall of a connection terminal so that a plug 22 mounted upon the end of a fiber optic drop cable may be readily inserted into the receptacle 20 to extend the communications network to a subscriber premises, such as a residence or business. The receptacle 20 and plug 22 are mated to optically connect a plurality of optical fibers of the plug 22 with a plurality of optical fibers terminated from a distribution cable within the connection terminal. It should be understood, however, that the receptacle 20 may be mounted to other structures, such as an internal wall of a re-enterable connection terminal, or may be utilized as a stand-alone interconnection assembly, for example, in field communications to interconnect optical transmitting and receiving equipment. Each connector port is operable for receiving a receptacle 20 and at least one connectorized optical fiber from inside the connection terminal. The connector port is further operable to receive a plug 22 comprising at least one connectorized optical fiber of a drop cable that is inserted into the receptacle 20 from outside the connection terminal. The plug 22 is mounted upon the end portion of the drop cable and is adapted to mate with the corresponding receptacle 20. The plug 22 and the receptacle 20 are operable for aligning and maintaining the optical fibers in opposing relation for transmitting an optical signal. In particular embodiments, the opposing optical fibers are aligned and maintained in physical contact with one another. Further, the end faces of the optical fibers may be angled, as will be described, to improve the optical transmission characteristics (e.g., reflectance) of the optical connection.

Figure 1:
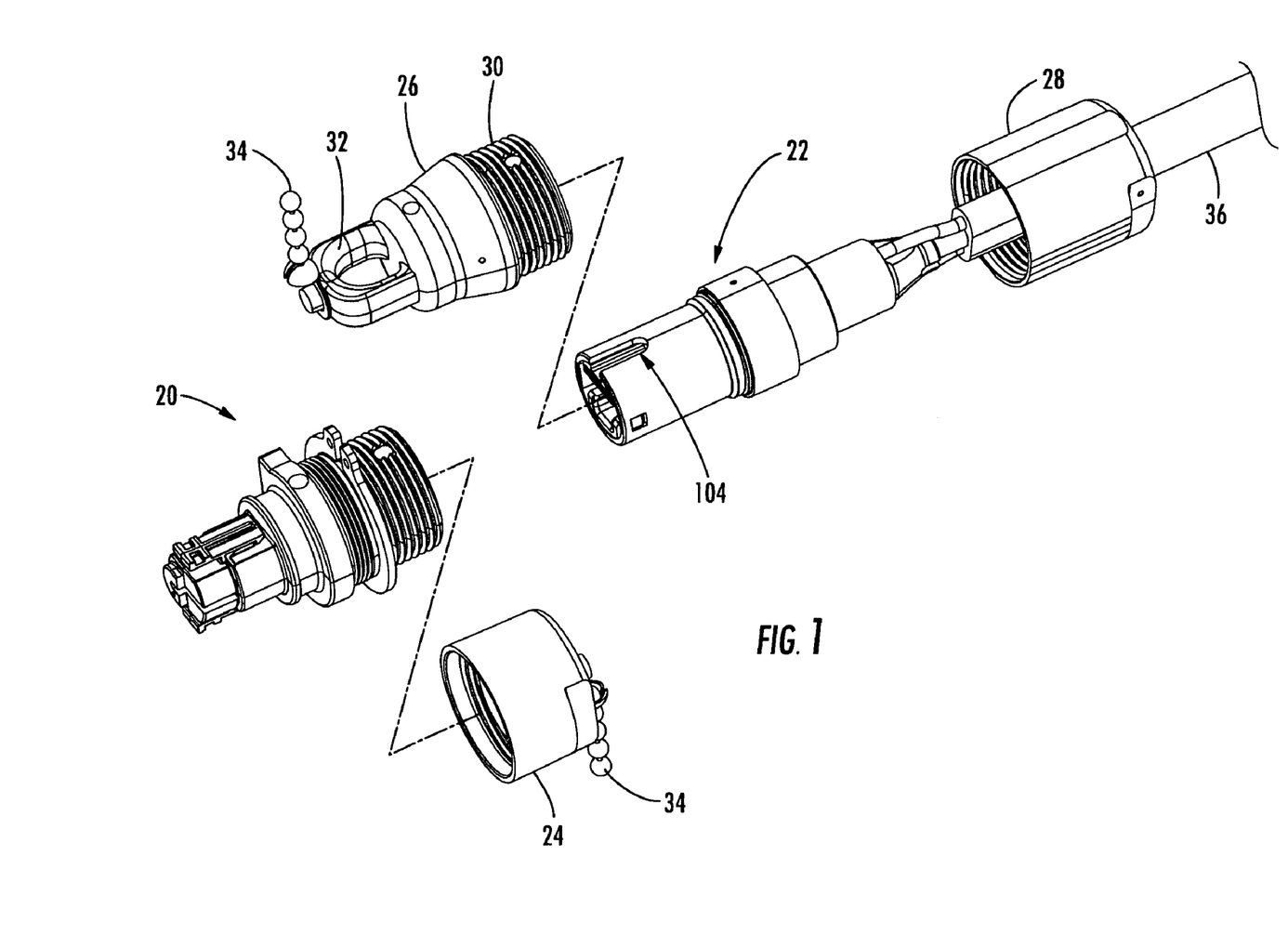
FIG. 1 is a perspective view of a multi-fiber fiber optic receptacle and plug assembly according to the invention shown disengaged and with the respective dust and pulling caps removed.

Referring specifically to FIG. 1, the receptacle 20 and the corresponding plug 22 are shown disengaged and with the protective dust cap 24 of the receptacle 20 and the protective pulling cap 26 of the plug 22 removed. A threaded coupling nut 28 on the plug 22 is operable for securing the plug 22 to the receptacle 20 upon engagement and may also be used to secure the pulling cap 26 during shipping and deployment of the drop cable. The pulling cap 26 defines a threaded portion 30 at its rearward end and a pulling loop 32 at its forward end. The pulling cap 26 provides protection of the optical connector of the plug 22 during shipping and deployment, and until engagement of the plug 22 with the receptacle 20. The pulling cap 26 may be secured to the drop cable 36 using a tether 34 so that the pulling cap 26 may be reused if the plug 22 is later disengaged from the receptacle 20. In preferred embodiments, the pulling loop 32 should be able to withstand cable-pulling forces up to about 600 lbs. The pulling loop 32 and the pulling cap 26 have a generally rounded forward end to facilitate deployment through conduits or ducts and over sheave wheels or pulleys. As with the plug 22 of the assembly, the receptacle 20 may also be covered and sealed with a threaded protective dust cap 24 during shipping and deployment that is removed prior to inserting the plug 22 into the receptacle 20. The dust cap 24 may likewise be secured to the receptacle 20 using a tether 34. At the end of the receptacle 20 opposite the dust cap 24, a pre-formed, elastomeric seal boot (not shown) may provide protection for the receptacle 20 from the environment within the connection terminal and in some embodiments may also provide a sealing function. The protective boot allows the assembly to be installed in a breathable connection terminal or similar enclosure, and may be unnecessary in the event the receptacle 20 is otherwise reliably sealed from the environment.

Figure 2:
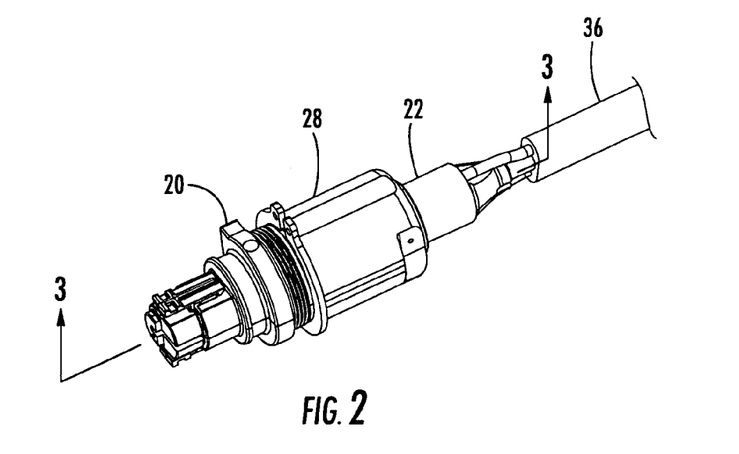
FIG. 2 is a perspective view of the fiber optic receptacle and plug assembly of FIG. 1 shown with the receptacle and plug mated.
Figure 3:
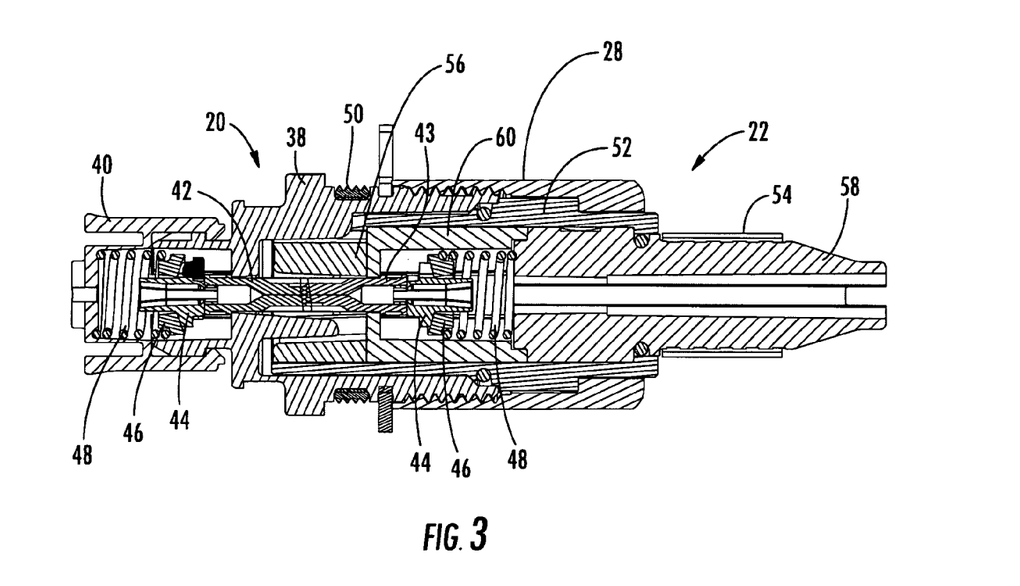
FIG. 3 is a cross-sectional view of the mated receptacle and plug assembly of FIG. 2 taken along line 3-3.

Referring specifically to FIG. 2, the fiber optic plug 22 is mounted upon the end portion of the fiber optic drop cable 36 and is adapted to mate with the corresponding fiber optic receptacle 20. To secure the plug 22 and receptacle 20 together, the coupling nut 28 engages the threaded end of the receptacle 20. The manner in which the receptacle and plug assembly is secured within the connector port through the external wall of the connection terminal is described below. FIG. 3 is a cross-sectional view of the mated receptacle 20 and plug 22 of FIG. 2 taken along line 3-3. The receptacle 20 includes a one-piece housing 38, a ferrule retainer 40, a multi-fiber ferrule 42, guide pins (not shown), a pin-retaining clip (not shown), a ferrule boot 44, a spring centering cuff 46, a round spring 48 and a multi-point seal 50, among other components. The plug 22 includes an outer housing 52, a crimp band 54, a coupling nut 28, an alignment sleeve 56 and a plug sub-assembly 86 including a crimp insert 58, an inner housing 60, a multi-fiber ferrule 43, a ferrule boot 44, a spring centering cuff 46 and a round spring 48, among other components. The specifics of the receptacle 20 and plug 22 components and sub-components are described in greater detail below.

Figure 4A:
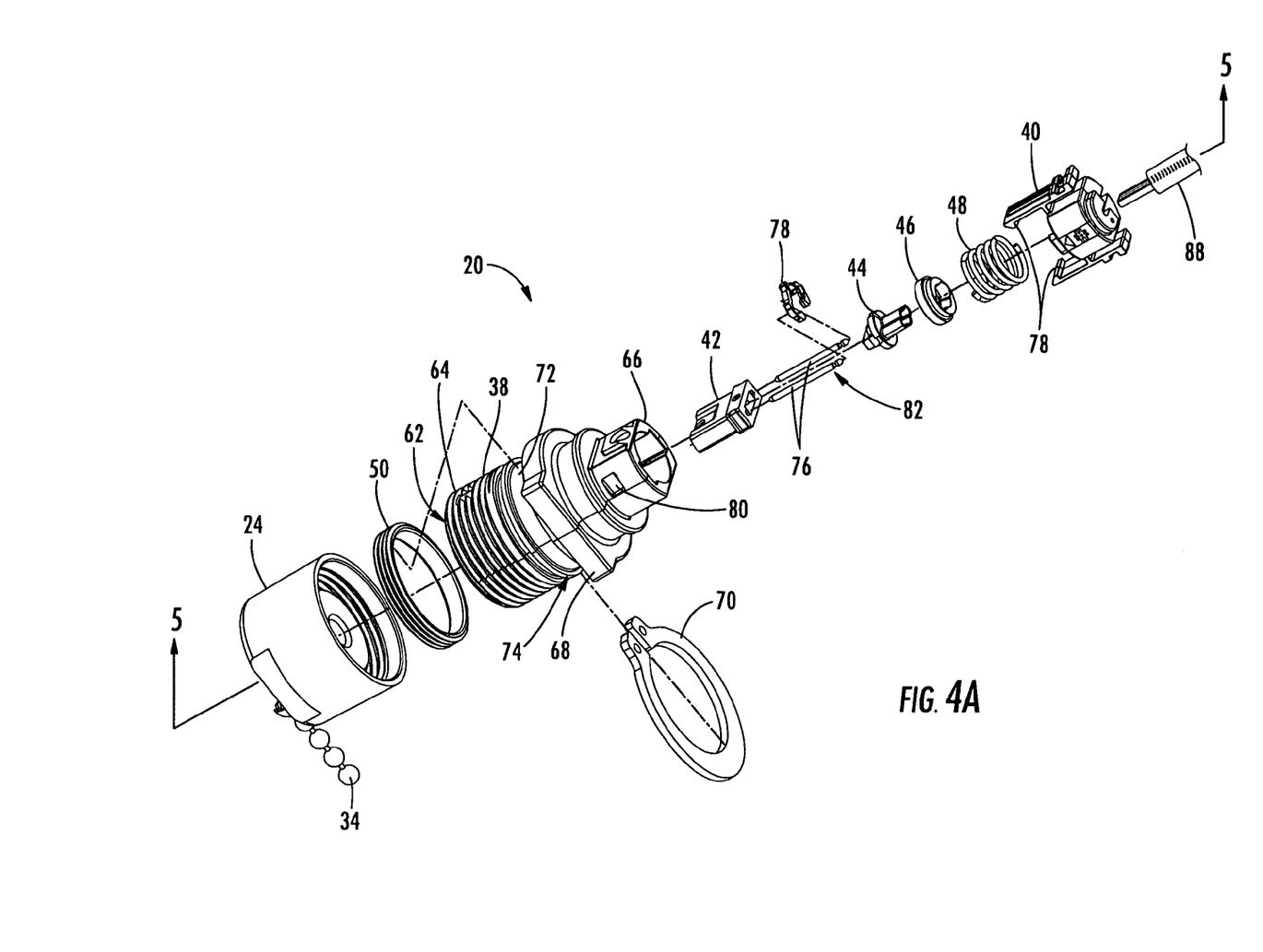
FIG. 4A is an exploded perspective view of the fiber optic receptacle of FIG. 1 including a one-piece housing, a multi-fiber ferrule, guide pins, a pin retaining clip, a ferrule boot, a spring centering cuff, a round coil spring and a ferrule retainer.

Referring specifically to FIG. 4A, the fiber optic receptacle 20 includes a one-piece receptacle housing 38 operable for mounting within a connector port of a connection terminal or used as a stand-alone interconnection receptacle. The receptacle housing 38 holds a fiber optic ferrule assembly and is configured to align the ferrule assembly of the receptacle 20 with a fiber optic ferrule assembly of a corresponding fiber optic plug 22 so that they can engage in only one preferred orientation, as will be described in greater detail below with reference to FIG. 10. This feature is particularly advantageous for receptacle and plug assemblies including multi-fiber ferrules, as well as Angled Physical Contact (APC) type ferrules where minimal angular offset between the opposing ferrules is required. The receptacle housing 38 defines an internal cavity 62 opening through opposed ends, a first end 64 and a second end 66. Typically, the opening through the first end 64 is relatively large so as to receive the corresponding fiber optic plug 22. Conversely, the opening through the second end 66 is typically smaller and, in one advantageous embodiment, is sized to be only slightly larger than the receptacle ferrule 42, such that the ferrule 42 can be inserted through the opening. The relatively large opening of the first end 64 allows cleaning with a cotton swab or special cleaning tool. This is advantageous since receptacles, in contrast to fiber optic plugs, may be exposed to adverse environmental conditions, such as dust, moisture and insect infestation, while not being used for a prolonged period of time. The first end 64 of this embodiment allows for easy cleaning and improved access without requiring disassembly.

Figure 9:
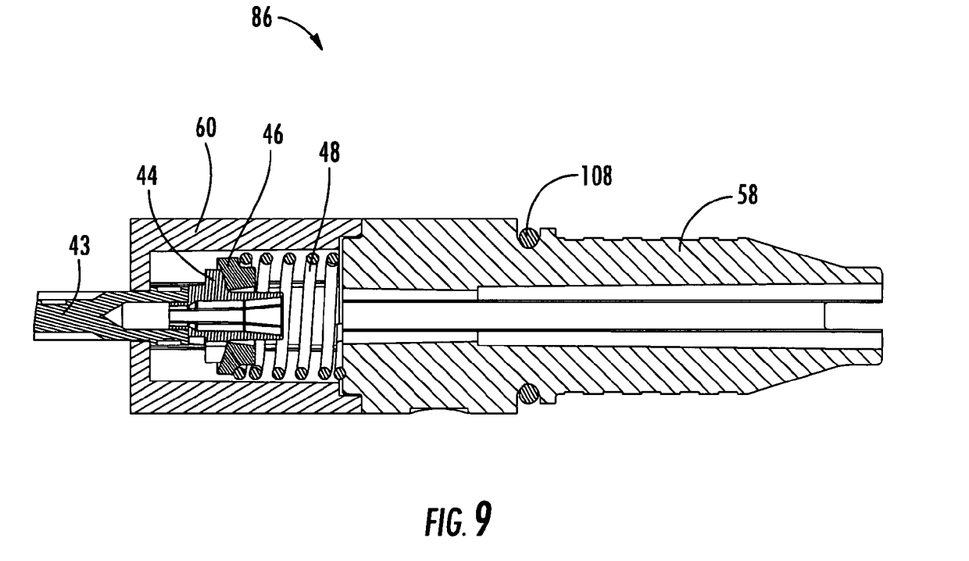
FIG. 9 is a cross-sectional view of the plug sub-assembly of FIG. 8 shown in an assembled configuration and taken along line 9-9.
Figure 10:
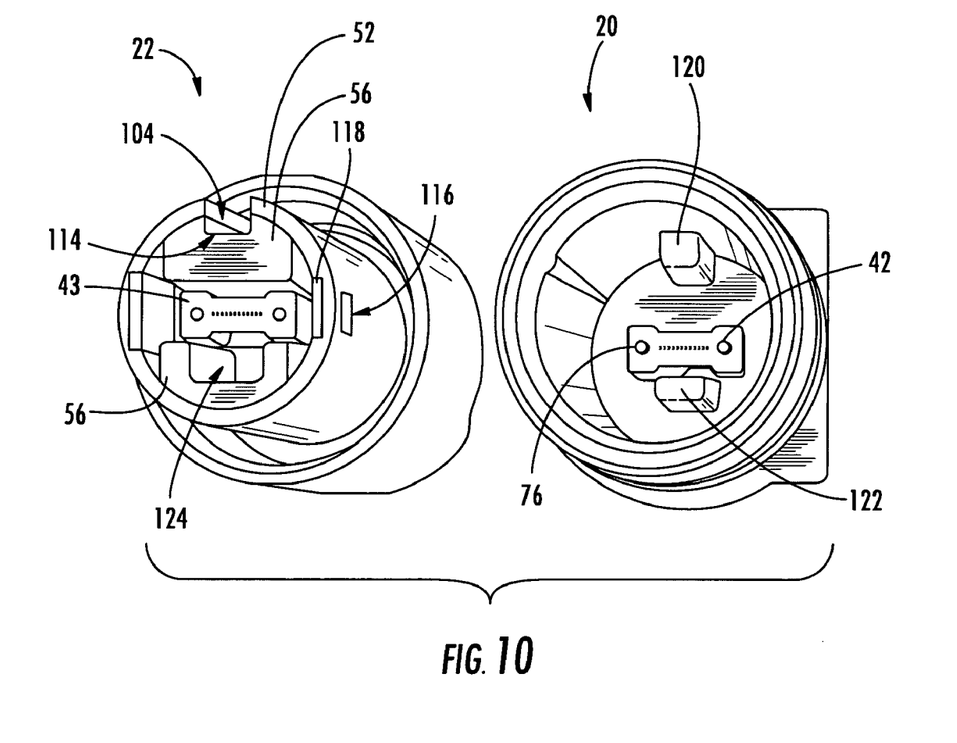
FIG. 10 is an end view of the fiber optic receptacle and fiber optic plug of FIG. 1 shown disengaged to illustrate the alignment and keying features of the receptacle and plug assembly.

The receptacle 20 of the exemplary embodiment described and shown includes a multi-fiber receptacle ferrule 42 of the multiple termination family by way of example, and not of limitation. As best shown in FIG. 10, the ferrule 42 includes a single row of twelve optical fibers, however, any multi-fiber connector may be used in the practice of the present invention comprising any number of optical fibers arranged in any manner. Although not included in this particular embodiment, the fiber optic receptacle 20 may include an alignment sleeve disposed within the internal cavity 62 defined by the receptacle housing 38. In the embodiments shown throughout FIGS. 1-10, the alignment sleeve is a component of the plug 22 and is inserted into the internal cavity 62 upon insertion of the plug 22 into the receptacle 20. Regardless, the plug ferrule 43 is inserted into one end of the alignment sleeve, while the receptacle ferrule 42 that is mounted upon the ends of optical fibers 88 terminated from within the connection terminal (e.g., direct connectorized optical fibers from a distribution cable or a pigtail spliced to optical fibers from a distribution cable) is inserted through the opening defined by the second end 66 of the receptacle 20 and into the other end of the alignment sleeve.

As shown, the receptacle housing 38 is cylindrical in shape and defines a shoulder portion 68 positioned medially between the first end 64 and the second end 66. In a particularly advantageous embodiment, the first end 64 of the receptacle housing 38 is inserted through an external wall of a connection terminal from inside the connection terminal until the radial surface of the shoulder portion 68 facing the first end 64 abuts the inner surface of the wall. A retaining ring 70 is secured around the receptacle housing 38 against the outer surface of the wall, thus retaining the wall between the retaining ring 70 and the shoulder portion 68 of the receptacle housing 38. By securing the shoulder portion 68 against the inner surface of the wall, as opposed to a threaded nut, the relatively low profile receptacle 20 provides strain relief against cable-pulling forces of up to about 600 lbs. Preferably, a seal is provided between the shoulder portion 68 of receptacle housing 38 and the inner surface of the wall using an O-ring, an elastomeric ring, a multi-point seal 50 (as shown) or like sealing means. The receptacle housing 38 defines a circumferential groove 72 between the shoulder portion 68 and the threaded portion for receiving the multi-point seal 50. Another circumferential groove 74 may be provided to receive the retaining ring 70. A key, shown in the form of a flat or partially-square shape on the shoulder portion 68, may be provided to be received within a recess having a corresponding shape formed in the inner surface of the wall, thus providing a mechanical feature that prevents the receptacle 20 from rotating within the connector port and ensuring that all receptacles 20 are installed in a desired orientation.

The receptacle 20 also includes a biasing member assembly comprising a ferrule boot 44, a spring centering cuff 46 and a round coil spring 48. A ferrule retainer 40 functions to retain the receptacle ferrule 42 and the biasing member assembly within the interior cavity 62 of the receptacle housing 38. The biasing member assembly operably engages the receptacle ferrule 42 and the ferrule retainer 40 to urge the receptacle ferrule 42 toward the first end 64 of the receptacle housing 38. Biasing means for conventional multi-fiber connectors, such as existing MPO connector and MT ferrule-based connectors, utilize an oval spring to fit over the rear of the ferrule boot 44, while still permitting a 12-fiber optical ribbon to pass through. Inherently, an oval spring exhibits a different stiffness in the x and y direction that leads to the introduction of off-axis forces and possible instabilities because the spring typically does not apply its biasing force directly along the axial centerline. In addition, there is less part-to-part variability in manufacturing a round spring as opposed to a non-round spring, and in particular an oval, elliptical, square or rectangular spring.

The off-center biasing force of the non-round spring creates an angularity of the end face of the ferrule 42 relative to the radial plane of the receptacle housing 38, which causes the optical fibers to be ahead of the radial plane on one side of the centerline and behind the radial plane on the opposite side of the radial plane. Thus, when the opposing receptacle and plug ferrules 42, 43 are mated, the angularity of the end face causes the forwardmost optical fibers to contact the optical fibers of the opposing ferrule although the rearwardmost optical fibers are not in contact. As a result, either a pre-stressed torque force is introduced within the receptacle and plug assembly, or at least some of the opposing optical fibers remain out of contact. The round spring 48 of the present invention, in conjunction with the ferrule boot 44 and the spring centering cuff 46, operate to apply a centered biasing force against the rear of the receptacle ferrule 42. In other words, the round spring 48, spring centering cuff 46 and the ferrule boot 44 provide a centralized force application despite the optical ribbon being situated within the center of the ferrule 42, without modifying the design and construction of conventional multi-fiber ferrules. As utilized herein, the term "centralized force application" refers to the combination of structural elements that cause the resultant biasing force exerted by the round coil spring 48 on the receptacle ferrule 42 (and/or plug ferrule 43) to be applied along the longitudinal axis defined by the receptacle housing 38. In preferred embodiments, the biasing force of the round spring 48 is applied at the lateral center of the ferrule end face, most preferably between the two centermost optical fiber bores. Although not required, the cylindrical receptacle housing 38 facilitates the use of a round spring 48 in a compact, yet robust receptacle and plug assembly that significantly reduces any off-center component of the biasing force with respect to conventional multi-fiber ferrule-based (e.g., MT, MPO) assemblies.

The forward end of the round spring 48 seats against the rear of the spring centering cuff 46, which aligns the round spring 48 and couples the spring force to the ferrule boot 44. The spring centering cuff 46 comprises a bowl-shaped (i.e., generally concave) forward surface that bears against a domed-shaped (i.e., generally convex) rear surface on the ferrule boot 44 to provide a centralized force application to the lateral center of the end face of the ferrule 42. The rear surface of the ferrule boot 44 has a slightly smaller radius than the forward surface of the centering cuff 46 so that the bowl-shaped surface of the centering cuff 46 fits over the entire domed-shaped surface of the ferrule boot 44. The lower the friction between the spring centering cuff 46 and the ferrule boot 44, the more centered the resulting biasing force will be relative to the optical fiber array. The ferrule boot 44 is preferably made of a stiff elastomer, with optional low-friction properties or post-treatment, such that it will not deform under the pressure exerted by the spring 48 and can be inserted into the rear of the ferrule 42 without cracking. The elastomer material further provides a slight interference fit for sealing against the rear of the ferrule 42. As a result, the ferrule boot 44 functions to prevent epoxy from leaking between the ferrule boot 44 and the ferrule 42 and thereby avoids contamination of the pin retainer clip 78. The rear end of the ferrule boot 44 defines a reception window (funnel) for inserting the optical fibers 88 in both pre-assembled and discrete configurations. As previously stated, the rear of the ferrule boot 44 defines a domed-shaped surface that has its theoretical focal point aligned with the lateral center of the end face of the ferrule 42. Thus, the ferrule boot 44 simultaneously provides sealing, fiber guiding and centered force application functions.

Figure 4B:
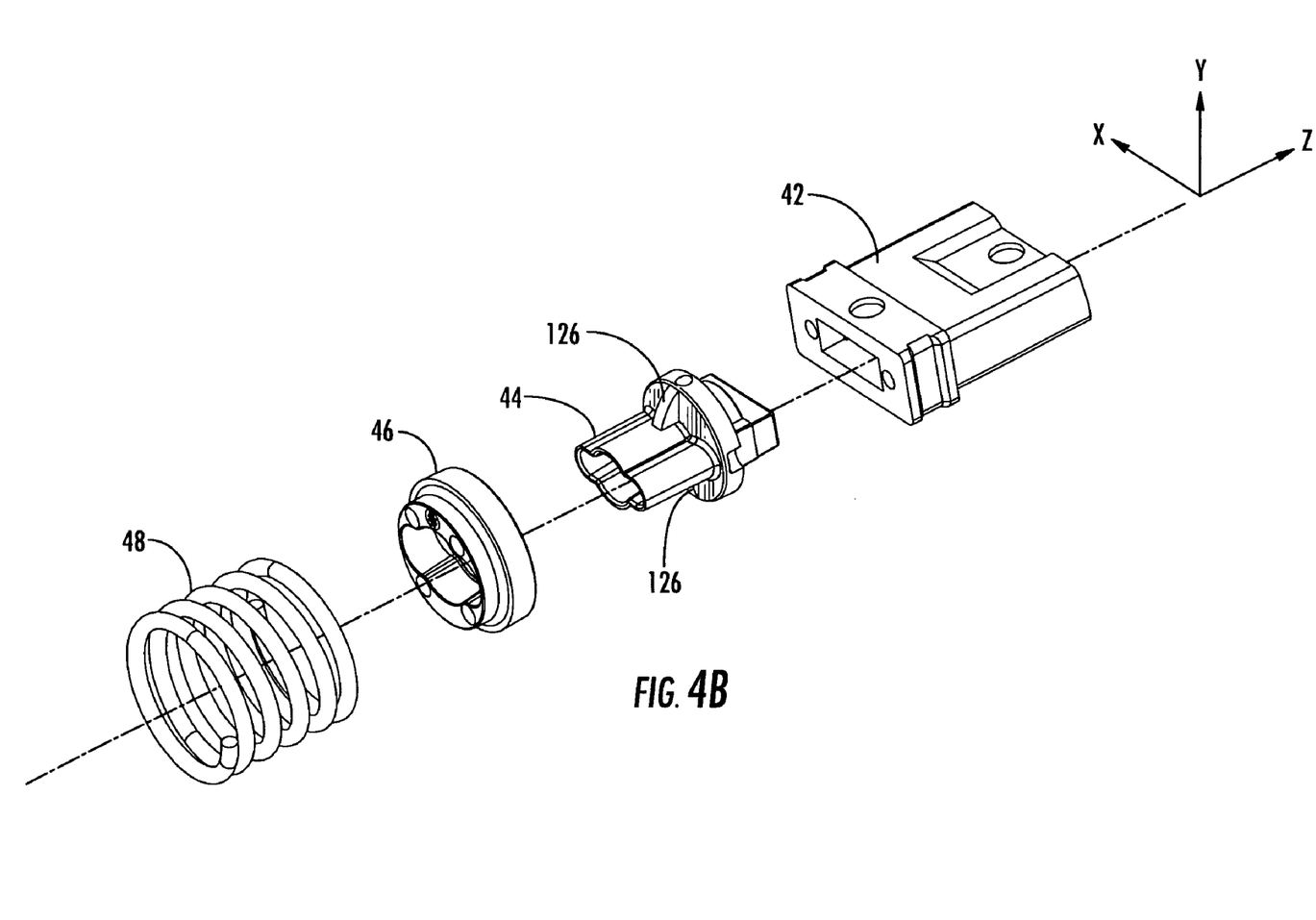
FIG. 4B is an exploded perspective view of an alternative embodiment of the biasing member assembly shown in FIG. 4A including a ferrule boot, a spring centering cuff, a round coil spring and a multi-fiber ferrule.

Referring to FIG. 4B, an alternative embodiment of the biasing member assembly of FIG. 4A is shown. In this embodiment, the domed-shaped surface of the ferrule boot 44 is replaced by a generally flat radial surface having a pair of ribs 126 that protrude rearwardly from the flat surface and are symmetrically spaced apart by about 180 degrees. Preferably, the ribs 126 are aligned generally parallel to the lateral (i.e., height wise) Y axis of the ferrule 42 depicted in FIG. 4B. The ribs 126 may be generally convex and similar in curvature to the domed-shaped rear surface of the ferrule boot 44 previously described and shown in FIG. 4A, or may be flat and thus parallel and space apart from the Y axis of the ferrule 42. Furthermore, convex or flat ribs 126 may be provided in addition to the dome-shaped rear surface previously described. In preferred embodiments, convex ribs 126 are typically used is conjunction with a spring centering cuff 46 having a generally concave forward surface, and flat ribs are typically used in conjunction with a spring centering cuff 46 having a flat forward surface.

With respect to either rib shape, or combination, the ribs 126 function to center the biasing force of the spring 48 along the Y axis of the ferrule 42 while reducing or entirely eliminating any biasing force along the X axis of the ferrule 42 on either side of the Y axis. As a result, the resultant biasing force does not produce a rotational moment about the Y axis of the ferrule 42 that could lead to an undesired angularity of the end face of the ferrule 42. As previously discussed, a spring biasing force that is not centered along the longitudinal axis Z of a multi-fiber ferrule, or is not balanced about the longitudinal axis Z of a multi-fiber ferrule (or at least is not balanced about the Y axis of the ferrule 42) will not consistently produce adequate physical contact between mating pairs of opposed optical fibers, thereby resulting in unacceptable optical characteristics of the receptacle and plug assembly. In contrast, a conventional connector having an oval spring that applies a different resultant biasing force along its lateral (i.e., major and minor axes) may cause a rotational moment to be applied to the end face of the ferrule 42, which results in the end face of the ferrule 42 having an angularity relative to a radial plane normal to the longitudinal axis Z defined by the ferrule 42. If the end face of the ferrule 42 is rotated about the lateral axis Y, for example, certain of the mating optical fibers may lose physical contact with one another, thereby creating a gap between the optical fibers that introduces back reflection and attenuation loss. In the present invention, the biasing member assembly for centering the resultant spring biasing force along the longitudinal axis Z defined by the ferrule 42 is preferably balanced about one or both of the lateral axes X, Y defined by the end face of the ferrule 42. The preceding description regarding the operation of ferrule boot 44, spring centering cuff 46 and round spring 48 to center the resultant spring biasing force on receptacle ferrule 42 applies equally to plug ferrule 43 and the components 44, 46, 48 of the plug 22 may be configured the same or different than the corresponding components 44, 46, 48 of the receptacle 20.

Referring again to the embodiment shown in FIG. 4A, a pair of ferrule guide pins 76 are inserted into guide pin openings formed through the receptacle ferrule 42 and protrude a predetermined distance beyond the end face of the ferrule 42. The guide pins 76 are held in place with a pin retaining clip 78 that engages circumferential grooves 82 defined by the guide pins 76. In an alternative embodiment, the guide pins 76 may be inserted within corresponding guide pin openings formed through the plug ferrule 43. The pin retaining clip 78 is optional and may be pre-assembled on the ferrule boot 44 in order to permit post-polish insertion of the guide pins 76, if desired. The pin retaining clip 78 is positioned around the forward end of the ferrule boot 44. As described in detail below, the alignment sleeve of the plug 22 assists in gross alignment of the mating ferrules 42, 43, while the guide pins 76 assist in fine alignment of the mating ferrules, and in particular, the opposing optical fibers of the mating ferrules. The guide pin holes opening through the end face of the ferrule 42 are adapted to receive a respective guide pin 76 to align the ferrule 42 with the opposing ferrule 43 in a known manner well within the ordinary skill of an artisan, and as such, need not be described further herein. In the exemplary embodiments shown herein, the multi-fiber ferrule 42 is an MT-style ferrule and the body of the ferrule 42 defines at least one and, more typically, a pair of guide pin holes for receiving respective guide pins 76.

Figure 5:
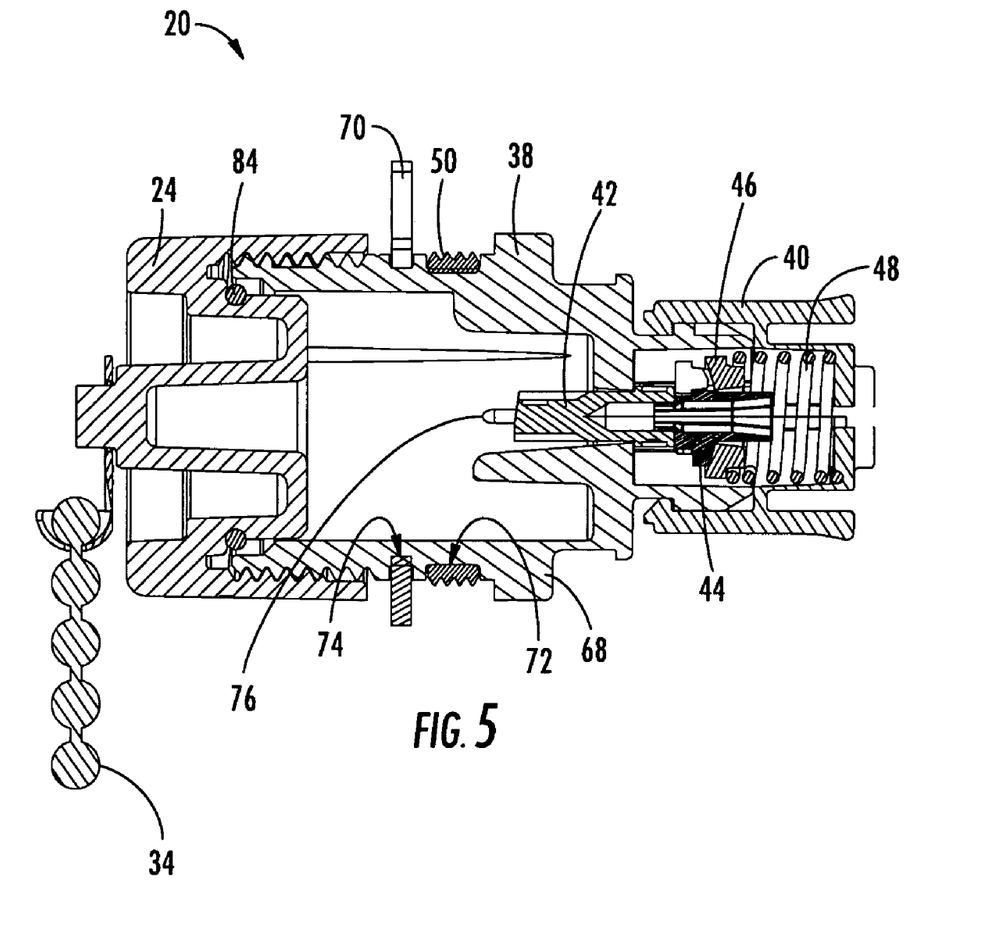
FIG. 5 is a cross-sectional view of the fiber optic receptacle of FIG. 4A shown in an assembled configuration and taken along line 5-5.

Referring to FIG. 5, a cross-section of the receptacle 20 of FIG. 4A taken along line 5-5 is shown in an assembled configuration, with like parts indicated by like reference numbers. In addition to the construction previously described, an O-ring 84 may be used to provide a seal between the protective dust cap 24 and the receptacle housing 38. As best shown in FIG. 5, the multi-point seal 50 is retained within the groove 72 of the receptacle housing 38 and provides multiple sealing points between the receptacle housing 38 and, for example, a wall of a connection terminal.

The receptacle ferrule 42 is spring-biased by the round spring 48, but is allowed to float axially within the internal cavity 62 of the receptacle housing 38 to thereby absorb compressive forces between the receptacle ferrule 42 and the opposing plug ferrule 43, which is preferably spring-biased by a corresponding round spring 48. The round spring 48 seats against a forward radial surface of the ferrule retainer 40 such that the spring 48 is slightly pre-compressed between the ferrule retainer 40 and the spring centering cuff 46. The ferrule retainer 40 may be secured to the receptacle housing 38 in any suitable manner, but in one advantageous embodiment, the ferrule retainer 40 includes flexible hooks 78 that are received by features 80 (FIG. 4A) that protrude outwardly from the receptacle housing 38. The ferrule retainer 40 can be disengaged from the receptacle housing 38 in order to remove the receptacle ferrule 42, such as for cleaning, repair, replacement or the like. The design of the ferrule retainer 40 allows for easy removal without a special tool. Once the receptacle ferrule 42 has been cleaned, repaired or replaced, the ferrule retainer 40 can be re-engaged with the receptacle housing 38.

Figure 6:
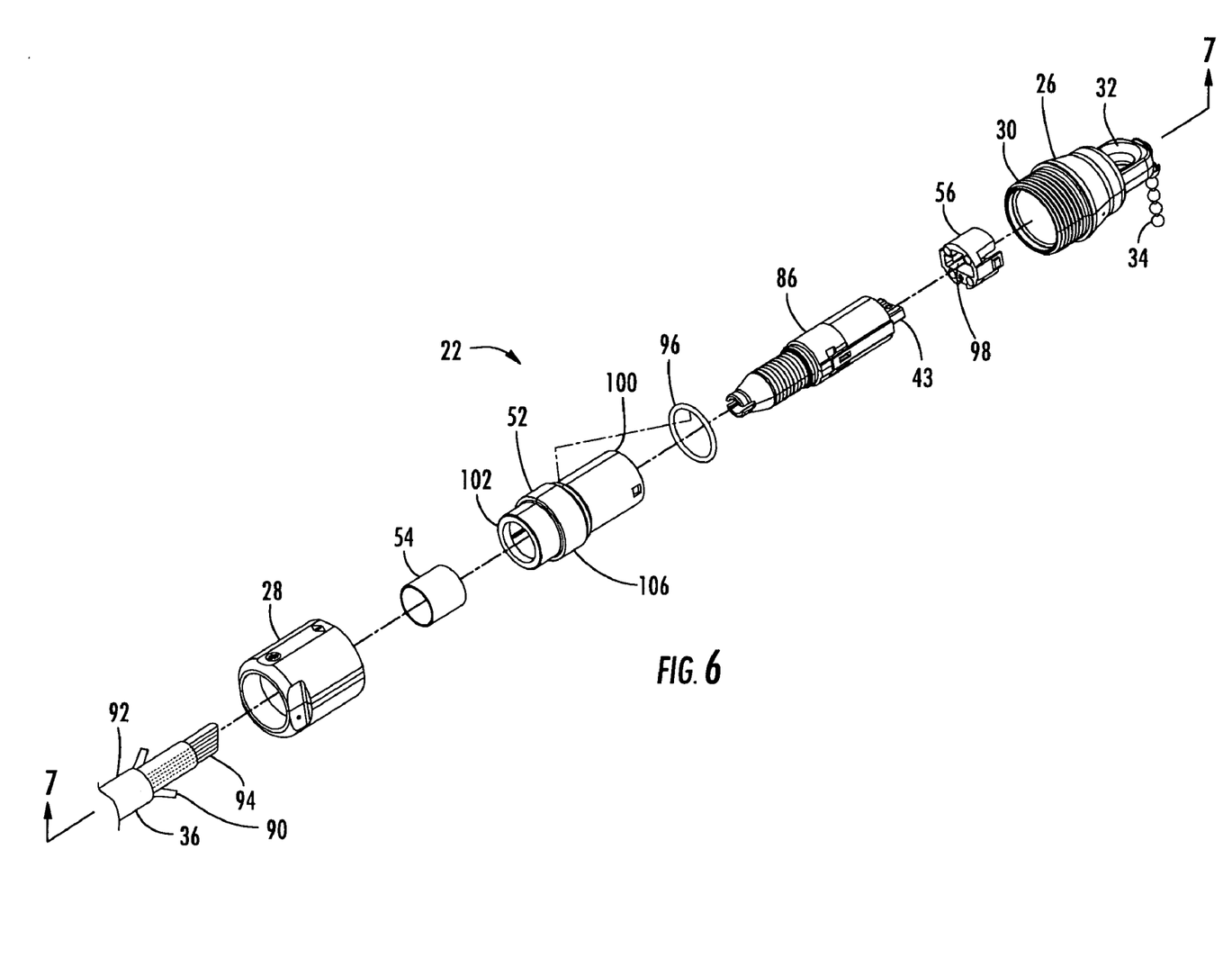
FIG. 6 is an exploded perspective view of the fiber optic plug of FIG. 1 including a plug sub-assembly, an outer housing, a crimp band, a coupling nut, an alignment sleeve and a pulling cap assembly.

Referring to FIG. 6, the fiber optic plug 22 includes a plug sub-assembly 86, an alignment sleeve 56, an outer housing 52, a crimp band 54 and a coupling nut 26. During shipping and deployment a protective pulling cap 26 may be threaded onto the plug 22 using the coupling nut 28. The cap 26 defines a pulling loop 32, a threaded portion 30 for engaging the coupling nut 28 and a tether 34 that may be attached to the drop cable 36 to retain the pulling cap 26 with the plug 22. There may also be a molded-on plug boot (not shown) made of a flexible (silicone-type or other like) material secured over a rear portion of the outer housing 52 and a portion of the drop cable 36 in order to seal the exposed portion of the drop cable 36 while generally inhibiting kinking and providing bending strain relief to the cable 36 near the plug 22. The strength components 90 are terminated and a crimp band 54 is secured around the strength components 90. The crimp band 54 is preferably made from brass, but other suitable deformable materials may be used. The strength members (not shown) are cut flush with the stripped back cable jacket 92, thereby exposing the GRP strength components 90 and an optical fiber ribbon comprising a plurality of ribbonized optical fibers 94. The crimp band 54 provides strain relief for the cable 36. The plug sub-assembly 86 is assembled by first crimping the crimp band 54 around a rear knurled portion. As is well understood by those of ordinary skill in the art, the outer housing 52 and the coupling nut 28 are threaded onto the cable 36 before the sub-assembly 86. The outer housing 52 is then slid over the plug sub-assembly 86.

The alignment sleeve 56 defines a lengthwise passageway 98 for receiving the plug ferrule 43 and the receptacle ferrule 42 when the plug 22 is mated with the receptacle 20. As stated herein, the alignment sleeve 74 may be a component of either the receptacle 20 or the plug 22. In the exemplary embodiment shown and described herein the alignment sleeve 74 is a component of the plug 22. The outer housing 52 has a generally cylindrical shape with a forward first end 100 and a rearward second end 102. The outer housing 52 generally protects the plug sub-assembly 86 and in preferred embodiments also aligns and keys engagement of the plug 22 with the mating receptacle 20. Moreover, the outer housing 52 includes a through passageway between the first and second ends 100 and 102. The passageway of the outer housing 52 includes an alignment and keying feature so that the plug sub-assembly 86 is inhibited from rotating once the plug 22 is assembled. The first end 100 of the outer housing 52 includes a key slot (see FIGS. 1 and 10 at reference numeral 104) for aligning the plug 22 with the receptacle 20, and consequently, the plug sub-assembly 86 relative to the receptacle 20. Thus, the plug 22 and the corresponding receptacle 20 are configured to permit mating in only one orientation. In preferred embodiments, this orientation may be marked on the receptacle 20 and on the plug 22 using alignment indicia so that a less skilled field technician can readily mate the plug 22 with the receptacle 20. Any suitable indicia may be used. After alignment, the field technician engages the internal threads of the coupling nut 28 with the external threads of the receptacle 20 to secure the plug 22 to the receptacle 20.

Figure 7:
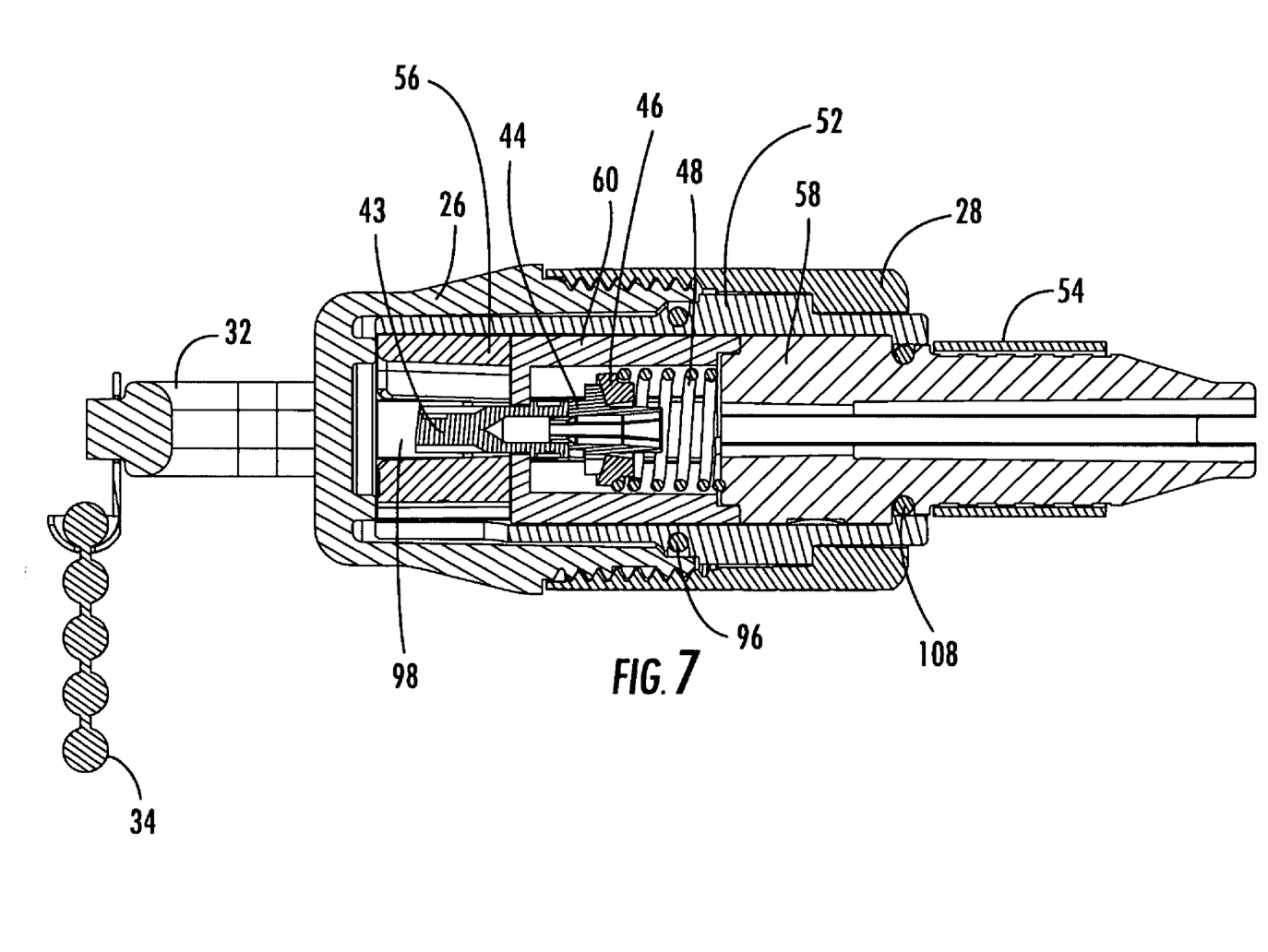
FIG. 7 is a cross-sectional view of the fiber optic plug of FIG. 6 shown in an assembled configuration and taken along line 7-7.

The outer housing 52 of the plug 22 may further define a shoulder 106 that serves as a mechanical stop for a conventional elastomeric O-ring 96 against a forward radial surface thereof and for the coupling nut 28 against a rearward radial surface thereof. The O-ring 96 provides an environmental seal when the coupling nut 28 engages the threaded portion of the receptacle housing 38. The coupling nut 28 has a passageway sized to loosely fit over the second end 102 and the shoulder 106 of the outer housing 52 so that the coupling nut 28 easily rotates about the outer housing 52. In other words, the coupling nut 28 cannot move in the direction of the receptacle 20 beyond the shoulder 106, but is able to rotate freely with respect to the outer housing 52. FIG. 7 is a cross-section of the plug 22 of FIG. 6 taken along line 7-7 and shown in an assembled configuration with like parts indicated by like reference numbers.

Figure 8:
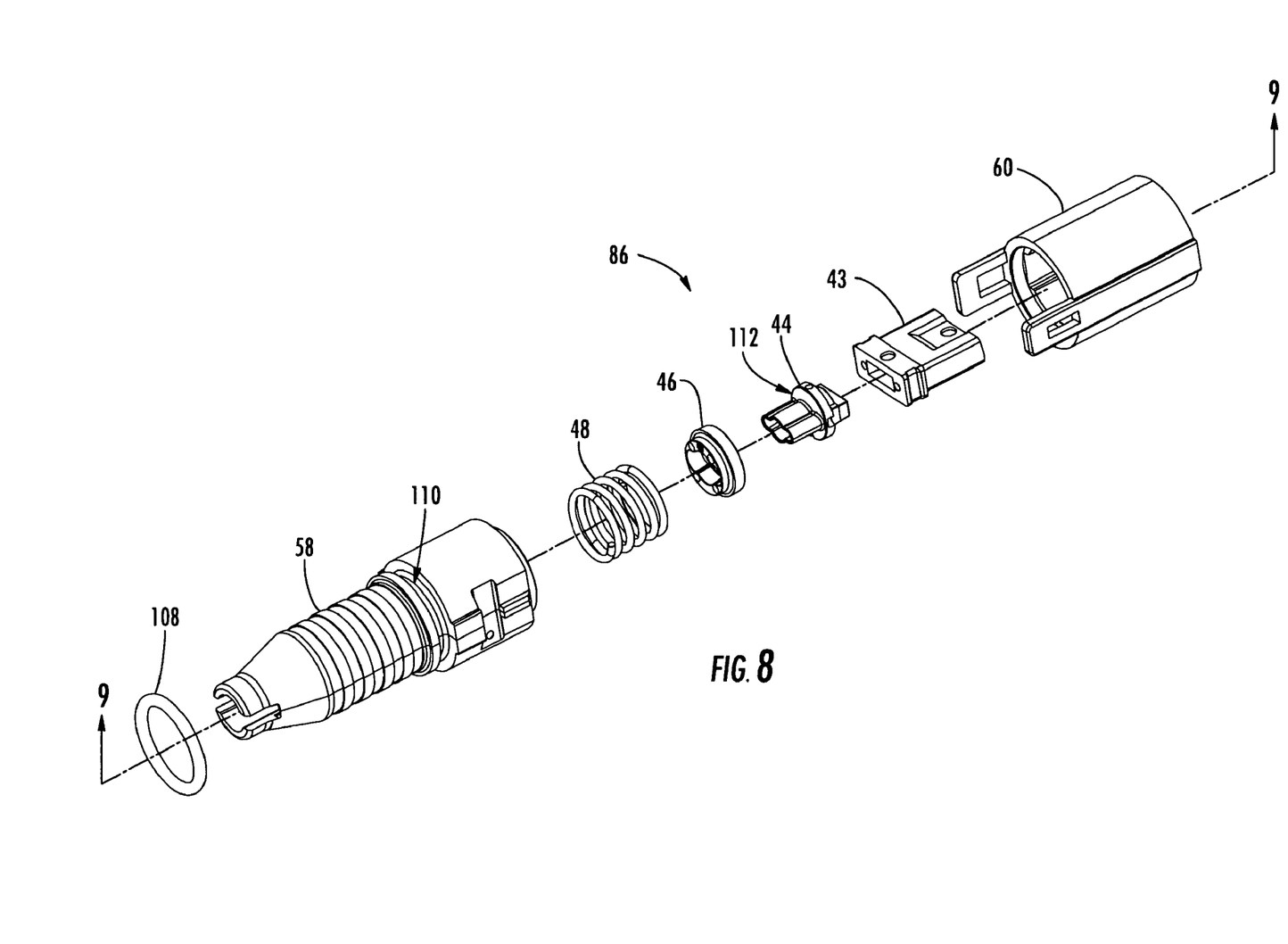
FIG. 8 is an exploded perspective view of the plug sub-assembly of FIG. 6 including a crimp insert, an inner housing, a multi-fiber ferrule, a ferrule boot, a spring centering cuff and a round spring.

Referring specifically to FIG. 8, the plug sub-assembly 86 is shown. Plug sub-assembly 86 comprises the multi-fiber ferrule 43, the ferrule boot 44, the spring centering cuff 46, the round spring 48, the crimp insert 58 and the inner housing 60, as previously described. The plug ferrule 43 is at least partially disposed within the inner housing 60, extends lengthwise and protrudes outwardly therefrom into the alignment sleeve 56. The plug ferrule 43 is mounted within the inner housing 60 such that the end face of the plug ferrule 43 extends somewhat beyond the forward end of the inner housing 60. As with the fiber optic receptacle 20, the fiber optic plug 22 includes a corresponding multi-fiber ferrule 43, preferably of like configuration. The plug 22 of the exemplary embodiment is shown to include a single 12-fiber MT-style ferrule 43. The plug sub-assembly 86 may also include an elastomeric O-ring 108 that seats within a groove 110 defined by the crimp insert 58. The O-ring 108 serves to provide a seal between the crimp insert 58 and the plug outer housing 52 when the coupling nut 28 engages the threaded portion of the protective pulling cap 26 or the receptacle 20.

As previously described with respect to the receptacle 20, the plug 22 likewise includes the biasing member assembly comprising the round spring 48, the spring centering cuff 46 and the ferrule boot 44. The biasing member assembly operably engages the plug ferrule 43 and a radial surface provided on the forward end of the crimp insert 58 to urge the plug ferrule 43 toward the first end 100 of the outer housing 52. The round spring 48 in conjunction with the ferrule boot 44 and the spring centering cuff 46 are operable in the manner described herein to apply a spring biasing force that is centered on the end face of the plug ferrule 43. In preferred embodiments, the biasing force of the spring 48 is applied on the end face of the ferrule 43 along the longitudinal axis defined by the plug 22, or is balanced about one or more lateral axes defined by the end face of the plug ferrule 43 such that the resultant biasing force causes the plane defined by the end face of the ferrule to be substantially normal to the longitudinal axis defined by the plug 22. The forward end of the round spring 48 seats against the rear of the spring centering cuff 46, which aligns the round spring 48 and couples the spring force to the ferrule boot 44.

The spring centering cuff 46 comprises a bowl-shaped (i.e., generally concave) forward surface that bears against a domed-shaped (i.e., generally convex) rear surface on the ferrule boot 44 to provide a centralized force application to the lateral center of the end face of the ferrule 43. The rear surface of the ferrule boot 44 has a slightly smaller radius than the forward surface of the centering cuff 46 so that the bowl-shaped surface of the centering cuff 46 fits over the entire domed-shaped surface of the ferrule boot 44. The lower the friction between the spring centering cuff 46 and the ferrule boot 44, the more centered the resulting biasing force will be relative to the optical fiber array. The ferrule boot 44 is preferably made of a stiff elastomer, with optional low-friction properties or post-treatment, such that it will not deform under the pressure exerted by the spring 48 and can be inserted into the rear of the ferrule 43 without cracking. The elastomer material further provides a slight interference fit for sealing against the rear of the ferrule 43. As a result, the ferrule boot 44 functions to prevent epoxy from leaking between the ferrule boot 44 and the plug ferrule 43. The rear end of the ferrule boot 44 defines a reception window (funnel) for inserting the optical fibers 94 in both pre-assembled and discrete configurations. As previously stated, the rear of the ferrule boot 44 defines a domed-shaped surface that has its theoretical focal point aligned with the lateral center of the end face of the ferrule 43. Thus, the ferrule boot 44 simultaneously provides sealing, fiber guiding and centered force application functions.

The plug ferrule 43 is spring-biased by the round spring 48, but is allowed to float axially within the inner housing 60 and the alignment sleeve 56 to thereby absorb compressive forces between the plug ferrule 43 and the opposing receptacle ferrule 42, which is preferably spring-biased by a corresponding round spring 48. The round spring 48 seats against a forward radial surface of the crimp insert 58 such that the spring 48 is slightly pre-compressed between the crimp insert 58 and the spring centering cuff 46. As previously discussed, the spring centering cuff 46 seats against the bearing surface of the ferrule boot 44 to center the resultant spring biasing force on the center of the end face of the plug ferrule 43. The rear of the ferrule boot 44 defines a reception window (funnel) for guiding the optical fibers 94 into the ferrule boot 44 and the plug ferrule 43. FIG. 9 is a cross-section of the plug sub-assembly 86 of FIG. 8 taken along line 9-9 shown in an assembled configuration with like parts indicated by like reference numbers.

Referring specifically to FIG. 10, an end view of the receptacle 20 and plug 22 of FIG. 1 is shown disengaged in order to illustrate alignment and keying features of the assembly. As described herein, the plug 22 engages the receptacle 20 to optically connect the optical fibers of the plug ferrule 43 and the corresponding receptacle ferrule 42. The alignment sleeve 56 is retained and positioned within the outer housing 52 of the plug 22 such that the key slot 114 of the alignment sleeve 56 is aligned with the key slot 104 defined by the plug outer housing 52. In a preferred embodiment, the plug outer housing 52 defines a pair of openings 116 along its length adjacent the first end 100 for receiving features 118 defined by the alignment sleeve 56. The features 118 are received by the openings 116 in order to properly align the alignment sleeve 56 within the plug outer housing 52, thus aligning the key slot 114 of the alignment sleeve 56 with the key slot 104 of the outer housing 52.

To perform an optical connection, the plug 22 is inserted into the receptacle 20. The receptacle 20 may only receive a plug 22 of like ferrule configuration. The receptacle 20 defines a first key 120 that is received within the key slot 104 of the plug outer housing 52 and the key slot 114 of the alignment sleeve 56. As shown, the key 120 is a protruding feature that is molded into the receptacle housing 38 of the receptacle 20. Receptacles having specific key shapes may be created for each type of multi-fiber receptacle ferrule 42 and plug ferrule 43 pair. While a generic outer housing 52 may be used for all ferrule types, alignment sleeves having a specific key shape may be inserted into the outer housing 52 to accommodate a specific ferrule. The receptacle 20 further defines a second protruding feature 122 that excludes a non-conforming alignment sleeve 56 to prevent a dissimilar plug ferrule 43 from being inserted into the receptacle 20 and mated with the receptacle ferrule 42. As shown, the alignment sleeve 56 of the plug 22 defines an opening 124 for receiving the second protruding feature 122 (also referred to herein as the "excluding feature 122"). The key 120 and the excluding feature 122 prevent rotation of the outer housing 52 relative to the receptacle housing 38 of the receptacle 20, while the guide pins 76 align the receptacle and plug ferrules 42, 43. Because the alignment and keying features extend to about the end of the plug 22, a plug 22 having a ferrule configuration different than the receptacle 20 is prevented from being inserted into the receptacle 20 prior to physical contact between the receptacle ferrule 42 and the plug ferrule 43, thereby eliminating potential damage to the end faces. Proper alignment is also important when mating multiple fibers in order to assure optimum optical transmission characteristics between opposing pairs of the optical fibers 88, 94.

In alternative embodiments, the threads of the coupling nut 28 and the receptacle housing 38 may be replaced with a bayonet or push-pull mechanism to secure the plug 22 within the receptacle 20. Alternatively, a spring clip or similar device may be added to engage the plug 22 with the receptacle 20 to secure them together. Sealing may be removed or relaxed based upon the extent of the adverse environment to which the assembly is exposed. The optional plug boot may be pre-manufactured and assembled onto the crimp insert 58 and the drop cable 36, or may be overmolded using a technology available from Corning Cable Systems LLC of Hickory, N.C. Further, heat shrinkable tubing may be used to fulfill the same purpose as the boot when aesthetics are less important and bend characteristics less stringent. As previously stated the alignment sleeve 56 may be integrated into the receptacle 20 while maintaining the same assembly technique and allowing for easy removal and cleaning of the receptacle ferrule 42.

Designs for several types of multi-fiber ferrules can be derived from the basic design shown and described herein. Multi-fiber ferrule designs driven by the available space and requirements are possible. Additional strain relief may be added to the receptacle 20 if needed. Crimping solutions may differ depending on the drop cable type and requirements. If the drop cable does not include the dual GRP dielectric strength members as shown, the methods of coupling the strength member(s) to the plug body may include glue or other means of fastening, such as clamps.

The embodiments described herein provide advantages over conventional multi-fiber fiber optic receptacle and plug assemblies. For example, the compact size of the exemplary embodiments described herein allows for about a 38 mm diameter package for FTTx drop cables and allows multiple receptacles to be mounted in connection terminals or other enclosures, while requiring very little penetration depth of the receptacle into the terminal or enclosure. The alignment and keying features of these assemblies makes them fully APC capable, and the unique fit prevents assembly errors during production and installation. By locating the alignment sleeve 56 within the plug 22 as opposed to the receptacle 20, the receptacle volume is reduced and components of the receptacle 20 exposed to the adverse environment for prolonged periods of time may be readily accessed and cleaned. An overmolded boot eliminates the need for heat shrinkable tubing and also improves the sealing integrity of the assembly under adverse conditions in which a pre-formed boot may disengage from the plug 22.

In the various embodiments described herein, the present invention provides multi-fiber fiber optic receptacle and plug assemblies including like multi-fiber optical connectors, such as MT-style or MPO-style technology connectors. The rigid shoulder 68 of the receptacle 20 is mounted against the inner surface of the wall of the terminal, thus providing superior retention for external pulling forces as compared to conventional threaded designs that use a nut on the inside of the wall for securing the receptacle 20. The fiber optic receptacle 20 and plug 22 assembly of the present invention provides a sealed design that prevents moisture and contamination from reaching the ferrule end faces. In all embodiments, O-rings provide static seals, and their position combined with relief features minimize vacuum build-up when removing the plug 22 from the receptacle 20 and pressure build-up when inserting the plug 22 into the receptacle 20. Generally speaking, most of the components of the receptacle 20 and plug 22 are formed from a suitable polymer. Preferably, the polymer is a UV stabilized polymer such as ULTEM 2210 available from GE Plastics, however, other suitable materials made also be used. For example, stainless steel or other suitable metals and plastics may be used.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A multi-fiber fiber optic receptacle adapted for engaging a complementary plug, the receptacle comprising:
   a receptacle housing having an aperture formed therein that defines an internal cavity adapted for receiving the complementary plug; and
   a receptacle multi-fiber ferrule that extends into the internal cavity of the receptacle housing;
   wherein an excluding feature and a key are formed in the internal cavity of the receptacle housing on opposite sides of the multi-fiber ferrule and the excluding feature is spaced away from all sidewalls of the internal cavity.

2. The multi-fiber fiber optic receptacle of claim 1, wherein the excluding feature is a protrusion formed integrally with the receptacle housing.

3. The multi-fiber fiber optic receptacle of claim 1, wherein the receptacle is externally threaded.

4. A multi-fiber fiber optic assembly comprising:
   the receptacle of claim 1;
   a plug for engaging the receptacle, the plug having a plug housing, an alignment sleeve, and a plug multi-fiber ferrule, wherein both the plug housing and the alignment sleeve of the plug have a key slot that are aligned and adapted for receiving the key of the receptacle during mating.

5. The multi-fiber optic assembly of claim 4, wherein the plug housing includes a plurality of openings for securing the alignment sleeve thereto.

6. The multi-fiber fiber optic assembly of claim 4, wherein the receptacle and the plug are generally cylindrical in cross-section.

7. The multi-fiber fiber optic assembly of claim 4, wherein the plug multi-fiber ferrule is a portion of a plug sub-assembly that further includes a crimp insert, a spring, a spring centering cuff, a ferrule boot, and an inner housing that attaches to the crimp insert.

8. The multi-fiber fiber optic receptacle of claim 1, the receptacle further including a ferrule boot, a spring centering cuff, and a ferrule retainer that is attached to the receptacle housing.

9. The multi-fiber fiber optic receptacle of claim 1, further including a pair of ferrule guide pins secured to the receptacle multi-fiber ferrule by a pin retaining clip.

10. A fiber optic assembly for optically connecting a plurality of optical fibers, comprising:
   a plug comprising a plug housing defining an internal cavity having at least one plug multi-fiber ferrule therein and defining a first and a second clearance opening within the internal cavity that respectively reside directly above and below the plug multi-fiber ferrule;
   a receptacle for receiving the plug, the receptacle comprising a receptacle housing defining an internal cavity having at least one receptacle multi-fiber ferrule therein and further defining an axially protruding key and an axially protruding exclusion feature that are respectively arranged directly above and below the receptacle multi-fiber ferrule so that the exclusion feature and the key are respectively received within the first and the second clearance openings of the plug when the at least one receptacle and the at least one plug are mated together, wherein the receptacle further comprises a ferrule boot, a spring centering cuff, and a ferrule retainer that is attached to the receptacle housing.

11. The fiber optic assembly of claim 10, wherein the receptacle is externally threaded and the plug further comprises an internally threaded coupling nut for threadably engaging the external threading of the receptacle.

12. The fiber optic assembly of claim 10, wherein the plug multi-fiber ferrule is a portion of a plug sub-assembly that further includes a crimp insert, a spring, a spring centering cuff, a ferrule boot, and an inner housing that attaches to the crimp insert.

13. The fiber optic assembly of claim 10, wherein the receptacle and the plug are generally cylindrical in cross-section.

14. The fiber optic assembly of claim 10, wherein at least one of the first and second clearance openings are defined by an alignment sleeve.

15. The fiber optic assembly of claim 10, wherein the receptacle and the plug further comprise a biasing spring.

16. The fiber optic assembly of claim 15, wherein the biasing spring of each of the receptacle and the plug centers a spring force on the end face of the receptacle and the plug ferrule.

17. A multi-fiber fiber optic plug adapted for engaging a complementary receptacle, comprising:
   a plug housing defining a first end, a second end and an internal cavity;
   at least one plug multi-fiber ferrule disposed within the plug housing; and
   an alignment sleeve attached to the plug housing, the alignment sleeve having first and second clearance openings disposed on opposite sides of the at least one plug multi-fiber ferrule for providing clearance for a protruding exclusion feature and a key of a complementary receptacle when the plug is engaged with the receptacle, wherein the plug housing includes a plurality of openings for securing the alignment sleeve therein.

18. The multi-fiber fiber optic plug of claim 17, further comprising an internally threaded coupling nut adapted for threadably engaging external threading of the complementary receptacle.

19. The multi-fiber fiber optic plug of claim 17, wherein the plug housing defines a key slot adapted for accepting a key of the complementary receptacle.

20. The multi-fiber fiber optic plug of claim 17, wherein the plug multi-fiber ferrule is a portion of a plug sub-assembly that further includes a crimp insert, a spring, a spring centering cuff, a ferrule boot, and an inner housing that attaches to the crimp insert.

21. A multi-fiber fiber optic assembly, comprising:
   the plug according to claim 17; and
   a receptacle connected to the plug, wherein the receptacle includes a receptacle multi-fiber ferrule, a ferrule boot, a spring centering cuff, and a ferrule retainer that is attached to a receptacle housing.

* * * * *